UNITED STATES PATENT OFFICE.

AUGUST H. LAUMAN, OF ALLEGHENY, PENNSYLVANIA.

METHOD OR PROCESS OF TREATING LIME.

SPECIFICATION forming part of Letters Patent No. 678,500, dated July 16, 1901.

Application filed August 1, 1900. Serial No. 25,578. (No specimens.)

*To all whom it may concern:*

Be it known that I, AUGUST H. LAUMAN, a citizen of the United States, and a resident of Allegheny, in the county of Allegheny, State of Pennsylvania, have invented or discovered a certain new and useful Improvement in Methods or Processes of Treating Lime, of which the following is a specification.

My invention relates to methods or processes of treating lime; and the objects of my invention are to lessen or reduce the time and labor required to slake lime and to treat lime in such wise that the tendency to slake, heat, expand, and shrink is overcome. The annoyance and frequent loss involved in storing and transporting lime and also at times in the use of it in plaster due to its tendency to slake, heat, expand, and shrink are well known to the dealers in and users of this material.

Heretofore, so far as I am aware, in preparing lime for building purposes—that is to say, in slaking the same—all the processes have been objectionable, in so far as the product thereof has a tendency to slake, expand, and shrink, and, in addition to this, a considerable period of time has been required in the application of said processes. I propose to remedy these evils by dry-slaking the burnt lime by adding thereto just that quantity of water sufficient to convert the lime into a hydrate of lime, and then by agitating or mixing the materials until the resultant product becomes a thoroughly-dry hydrate of lime, air being excluded from the lime during the slaking operation and the steam confined within the vessel during the operation.

In the application of my method or process I charge the burnt lime into a substantially air and steam tight cylinder or vessel, in which is rotatably mounted a series of arms or agitators. I then admit just sufficient water—i.e., a quantity sufficient to moisten and disintegrate the lime. I have discovered that one hundred (100) pounds of water to one hundred and eighty-five (185) pounds of lime produce excellent results—to convert the lime into a dry hydrate. I then seal the vessel and revolve the arms or agitators until the lime is reduced to a powdered dry hydrate uniformly and evenly slaked. In the beginning of the operation the union of the lime and water creates a high temperature within the sealed vessel, which converts a portion of the water not at once combined with the lime into steam, which during the constant agitation of the materials is thoroughly and uniformly absorbed by the lime, converting the same into a dry hydrate.

I have discovered that my method or process of treating lime prevents the lime from subsequently heating, slaking, expanding, and shrinking and prevents in a high degree the escape of carbon therefrom during the slaking operation, and it consequently possesses the property of hardening quickly when used in mortar.

In carrying out my method or process I employ a cylindrical vessel mounted on a shaft and capable of being sealed air and steam tight. The vessel is provided with one or more manholes for charging and discharging its contents and is also provided with an agitator, consisting of a series of radially-disposed arms mounted on the shaft which supports the vessel and capable of rotation within the vessel for the purpose of thoroughly agitating and mixing the materials during the slaking operation.

What I claim as my invention, and desire to secure by Letters Patent, is—

The herein-described method or process of treating lime which consists in adding to burnt lime just sufficient water to convert the same into a dry hydrate, the mixture being constantly agitated and thoroughly commingled and air excluded and pressure maintained during the conversion of the burnt lime into a dry hydrate of lime.

In testimony whereof I have hereunto set my hand in the presence of two subscribing witnesses.

AUGUST H. LAUMAN.

In presence of—
JOHN H. RONEY,
C. A. WILLIAMS.